(12) United States Patent
Waltermann et al.

(10) Patent No.: US 10,276,154 B2
(45) Date of Patent: Apr. 30, 2019

(54) PROCESSING NATURAL LANGUAGE USER INPUTS USING CONTEXT DATA

(71) Applicant: Lenovo (Singapore) Pte. Ltd., Singapore (SG)

(72) Inventors: Rod D. Waltermann, Rougemont, NC (US); Suzanne Marion Beaumont, Wake Forest, NC (US); Russell Speight VanBlon, Raleigh, NC (US); Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 158 days.

(21) Appl. No.: 14/259,672

(22) Filed: Apr. 23, 2014

(65) Prior Publication Data
US 2015/0310861 A1    Oct. 29, 2015

(51) Int. Cl.
  *G10L 21/00* (2013.01)
  *G10L 15/18* (2013.01)
(52) U.S. Cl.
  CPC ................ *G10L 15/1815* (2013.01)
(58) Field of Classification Search
  CPC ........................................ G10L 21/00
  USPC ..... 704/275, 246, 235, 270.1; 707/766, 771; 715/719, 728
  See application file for complete search history.

(56) References Cited

U.S. PATENT DOCUMENTS

| | | | |
|---|---|---|---|
| 6,839,669 B1 | 1/2005 | Gould et al. | |
| 8,606,568 B1* | 12/2013 | Tickner | G10L 15/1815 704/231 |
| 8,655,901 B1* | 2/2014 | Li | G06F 17/30864 704/7 |
| 8,781,840 B2* | 7/2014 | Jaramillo | G06F 17/30864 704/270.1 |
| 9,100,694 B1* | 8/2015 | Chandel | H04N 21/44218 |
| 9,183,835 B2* | 11/2015 | Burke | H04M 1/6083 |
| 9,462,340 B1* | 10/2016 | Mathurin | H04N 21/234336 |
| 2001/0020837 A1* | 9/2001 | Yamashita | B25J 13/003 318/567 |
| 2005/0075881 A1 | 4/2005 | Rigazio et al. | |

(Continued)

FOREIGN PATENT DOCUMENTS

WO   2012019028 A1   2/2012

OTHER PUBLICATIONS

Wetsel et al., Application as Filed for U.S. Appl. No. 14/097,954, filed Dec. 5, 2013, 28 pages.

(Continued)

*Primary Examiner* — Michael C Colucci
(74) *Attorney, Agent, or Firm* — Ference & Associates LLC

(57) ABSTRACT

An embodiment provides a method, including: receiving, at a device, user input; identifying, using a processor, elements included in the user input; determining, using a processor, that at least one of the identified elements renders the user input ambiguous; identifying, using a processor, a source of context data; accessing, using a processor, context data associated with the user input from the source of context data; disambiguating, using a processor, the user input based on the context data associated with the user input; and forming, using a processor, an altered input based on the disambiguating. Other embodiments are described and claimed.

21 Claims, 3 Drawing Sheets

(56) References Cited

U.S. PATENT DOCUMENTS

| | | | |
|---|---|---|---|
| 2007/0060118 A1* | 3/2007 | Guyette | H04M 1/72533 455/420 |
| 2007/0061712 A1 | 3/2007 | Bodin et al. | |
| 2007/0088556 A1 | 4/2007 | Andrew | |
| 2007/0174057 A1 | 7/2007 | Genly | |
| 2008/0208864 A1 | 8/2008 | Cucerzan et al. | |
| 2010/0046842 A1 | 2/2010 | Conwell | |
| 2011/0055256 A1 | 3/2011 | Phillips et al. | |
| 2011/0060587 A1* | 3/2011 | Phillips | G10L 15/30 704/235 |
| 2011/0161341 A1* | 6/2011 | Johnston | G06F 17/30976 707/766 |
| 2011/0283324 A1* | 11/2011 | Oh | H04N 21/234336 725/53 |
| 2012/0117112 A1* | 5/2012 | Johnston | G01C 21/3608 707/771 |
| 2012/0239661 A1 | 9/2012 | Giblin | |
| 2012/0278719 A1* | 11/2012 | Hwang | G10L 15/22 715/728 |
| 2012/0316878 A1 | 12/2012 | Singleton et al. | |
| 2013/0144727 A1* | 6/2013 | Morot-Gaudry | G06Q 30/02 705/14.72 |
| 2013/0290234 A1* | 10/2013 | Harris | G06N 5/022 706/46 |
| 2013/0293494 A1* | 11/2013 | Reshef | G06F 3/016 345/173 |
| 2013/0317936 A1* | 11/2013 | Hughes | G06Q 30/06 705/26.5 |
| 2014/0068692 A1* | 3/2014 | Archibong | H04L 65/4084 725/116 |
| 2014/0075316 A1* | 3/2014 | Li | G06F 17/30029 715/719 |
| 2014/0081633 A1* | 3/2014 | Badaskar | G06F 17/30023 704/235 |
| 2014/0122075 A1* | 5/2014 | Bak | G10L 15/32 704/246 |
| 2014/0324431 A1* | 10/2014 | Teasley | G10L 15/22 704/246 |
| 2015/0046418 A1* | 2/2015 | Akbacak | G06F 17/3002 707/706 |
| 2015/0161997 A1 | 6/2015 | Wetsel et al. | |
| 2015/0185854 A1* | 7/2015 | Kauffmann | G06F 3/017 345/175 |

OTHER PUBLICATIONS

Colucci, Michael C., Non-Final Office Action for U.S. Appl. No. 14/097,954, dated Jan. 5, 2016, 10 pages.

Wetsel et al., Amendment filed in Response to the Non-Final Office Action for U.S. Appl. No. 14/097,954, Apr. 5, 2016, 10 pages.

Colucci, Michael C., Interview Summary for U.S. Appl. No. 14/097,954, dated May 9, 2016, 3 pages.

Colucci, Michael C., Final Office Action for U.S. Appl. No. 14/097,954, dated May 20, 2016, 13 pages.

Wetsel et al., Requestes for Continued Examination and Amendment for U.S. Appl. No. 14/097,954, dated Sep. 20, 2016, 16 pages.

Colucci, Michael C., Non Final Office Action for U.S. Appl. No. 14/097,954, dated Oct. 24, 2016, 15 pages.

Wetsel et al., Amendment Filed in Response to the Non-Final Office Action for U.S. Appl. No. 14/097,954, Jan. 24, 2017, 12 pages.

Colucci, Michael C., Final Office Action for U.S. Appl. No. 14/097,954, dated Mar. 10, 2017, 19 pages.

Wetsel et al., Appeal Brief for U.S. Appl. No. 14/097,954, Aug. 14, 2017, 28 pages.

Colucci, Michael C., Final Office Action for U.S. Appl. No. 14/097,954, dated Nov. 9, 2017, 21 pages.

* cited by examiner

PROCESSING NATURAL LANGUAGE USER INPUTS USING CONTEXT DATA

BACKGROUND

Information handling devices ("devices"), for example laptop computers, tablets, smart phones, desktop computers, smart TVs, navigation devices, automobile consoles, etc., may be used to process user inputs, e.g., user voice inputs received by an audio receiver such as a microphone. For example, speech recognition technology enables a device to transform spoken words into machine text, e.g., by converting a digital audio signal into a machine text word, for use in an underlying application, e.g., a word processing document, a search application, etc.

Conventional improvements in speech recognition technology have primarily focused on accuracy of the recognition, i.e., accurately identifying the word or words actually spoken by the user. Some advances have been made in processing natural language user inputs such that various user inputs may be mapped to a predetermined input for taking an action, e.g., executing a command, responding to a query, etc. An example of a conventional application using such techniques is a so-called virtual assistant.

BRIEF SUMMARY

In summary, one aspect provides a method, comprising receiving, at a device, user input; identifying, using a processor, elements included in the user input; determining, using a processor, that at least one of the identified elements renders the user input ambiguous; identifying, using a processor, a source of context data; accessing, using a processor, context data associated with the user input from the source of context data; disambiguating, using a processor, the user input based on the context data associated with the user input; and forming, using a processor, an altered input based on the disambiguating.

Another aspect provides a device, comprising: an input device; a processor; and a memory device that stores instructions executable by the processor to: receive, via the input device, user input; identify elements included in the user input; determine that at least one of the identified elements renders the user input ambiguous; identify a source of context data; access context data associated with the user input from the source of context data; disambiguate the user input based on the context data associated with the user input; and form an altered input based on the disambiguated user input.

Another aspect provides a product, comprising: a storage device having code stored therewith, the code being executable by a processor and comprising: code that receives, via an input device, user input; code that identifies, using a processor, elements included in the user input; code that determines, using a processor, that at least one of the identified elements renders the user input ambiguous; code that identifies, using a processor, a source of context data; code that accesses, using a processor, context data associated with the user input from the source of context data; code that disambiguates, using a processor, the user input based on the context data associated with the user voice input; and code that forms, using a processor, an altered input based on the disambiguated user input.

A still further aspect provides a method, comprising: receiving, from a device, data relating to a user input; the data being used to identify, using a processor, at least one ambiguity contained in the user input; identifying, using a processor, a source of context data; accessing, using a processor, context data associated with the user input from the source of context data; disambiguating, using a processor, the user input based on the context data associated with the user input; and forming, using a processor, an altered input based on the disambiguated user input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
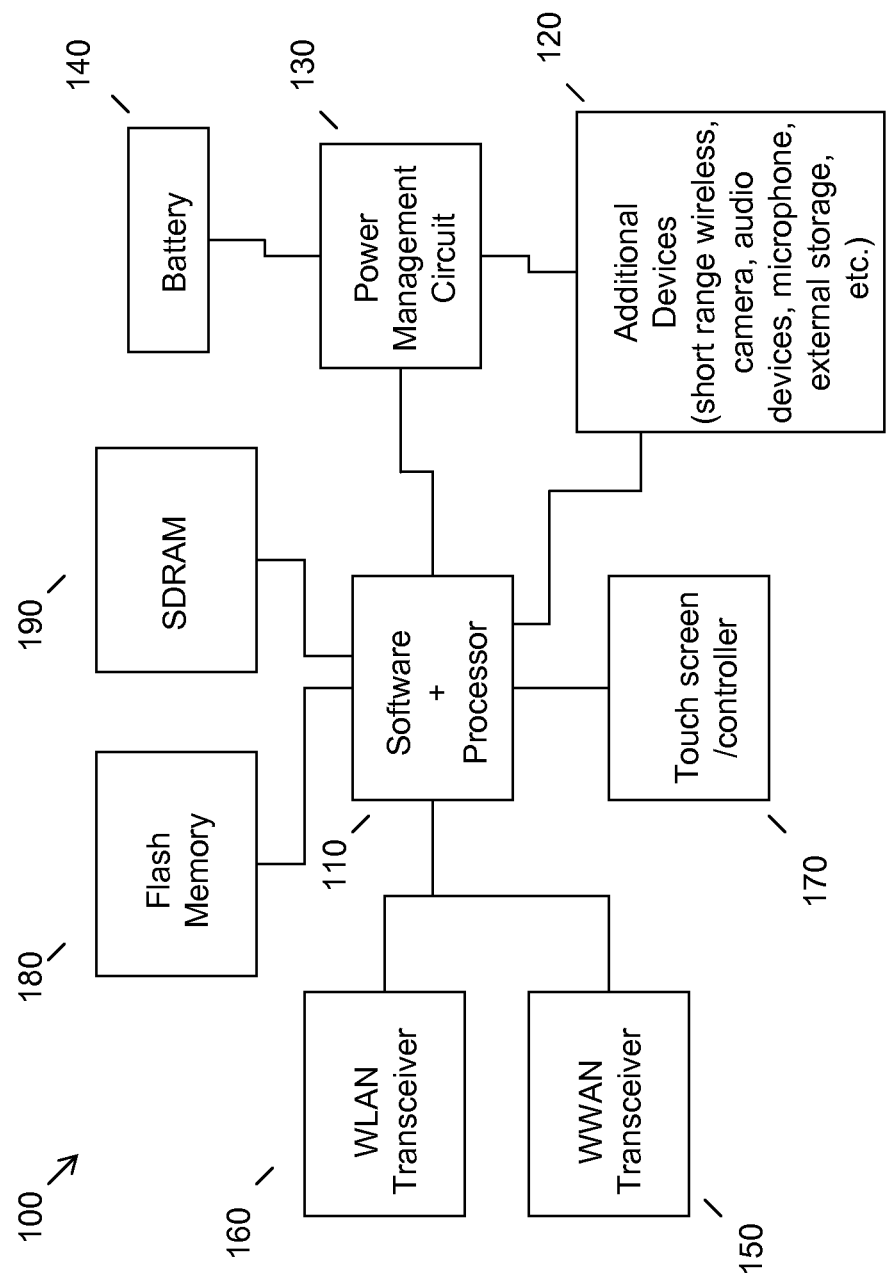
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Speech recognition technology is popular and used in connection with a variety of applications. For example, many device applications, e.g., Internet searching applications, word processing applications, communication applications (chat, email, SMS text, etc.) and the like may take voice input of the user, convert this voice input into a machine usable form (referred to herein as machine text—whether or not the voice signal is literally converted to text) for use by an application.

For example, a user may provide a voice input command such as "where can I get that". Current speech recognition technology will faithfully and accurately identify this voice input. That is, conventional speech recognition technology will accurately determine that the user has literally spoken the words "where can I get that". However, acting on this voice input in a way the user intends is another matter entirely. That is, the user input must be parsed and understood in order for the device to execute an appropriate action, e.g., determining what "that" refers to, which location is relevant to the word "where", e.g., in terms of its relationship to "that" and/or to the current location of the user making the query, etc.

Accordingly, an embodiment provides mechanisms for using context data to interpret natural language user inputs. Throughout, natural language voice or speech user inputs are used as non-limiting examples of user inputs and processing thereof, though the principles and techniques described throughout may be applied to other user inputs, e.g., manual or typed user inputs, gesture inputs, etc.

In an embodiment, various elements such as words of a user's voice input are identified, e.g., as conventionally known. An embodiment supplements the standard execution of preprogrammed or predetermined commands and queries, e.g., using certain key words or trigger phrases, with the ability to identify the source of ambiguity within the voice input (e.g., a word or word(s) that would normally render the command un-executable or the query unanswerable) along with an ability to leverage context data (from a variety of sources, including other devices) that disambiguates the user input such that it may be appropriately processed.

By way of example, an embodiment takes a user voice input from a first or second device and changes the processing of that user voice input (e.g., a request) based on the device context. A first device may be, e.g., a smart television (TV), a laptop, a smart phone, a car computer, etc., that a user is actively using to consume a piece of content (e.g., audio or video content). An optional second device may be any other device that the user could use to send input to the primary device (e.g. smart phone, tablet, etc).

By way of example, while watching a TV, a user may ask a virtual assistant (e.g., as implemented in an application running on the user's smart phone) some of the following types of questions about a TV show currently playing on the TV. In the example of a TV commercial, a user might ask "where can I buy that". In response, depending on the commercial playing, an embodiment may utilize context data resident on the television or another device (e.g., network or cloud device having program guide information or commercial information) to suggest nearby stores offering the product featured in the commercial for sale. Thus, if the commercial playing on the television were identified via a context data source on another device (e.g., TV, cloud device, etc.) as a car commercial, an embodiment may retrieve and provide data based on car dealers located within a predetermined area of the user, e.g., by locating the user device.

An embodiment may refine the answer using additional context data, e.g., from the query itself or additional context data source(s). For example, if the user had asked, while the TV commercial containing the car was playing, "where is the nearest dealer", an embodiment may determine from another data source, e.g., a camera of the user device capturing a photo of the car or a microphone of the user device capturing audio of the commercial, etc., contextual data that enables an embodiment to detect a car make or model, and retrieve map data related to nearby dealers.

As an embodiment accesses more refined context data, more refined data may be provided to answer a user's query. For example, if a movie preview were playing, e.g., on the user's smart phone having the virtual assistant or on another device, e.g., a proximately located TV or desktop computer, a user may provide voice input of "where is that playing". Based on contextual data identifying the movie and a location of the user, an embodiment may suggest theatres and times. Additional context data may be accessed, e.g., calendar entries on the user's smart phone, etc., to help the user coordinate their schedule in the form of providing a more refined answer—e.g., an answer to the user's query that is particularly relevant to the user's context. Similarly, if the commercial playing were for a concert and a user provided voice input of "where can I get tickets", an embodiment may respond by displaying box office times and prices, e.g., displayed on the user's smart phone, on the TV playing the commercial, or elsewhere.

In this regard it is worth noting that an embodiment may coordinate with other services available to the user. For example, if the user is watching a particular TV show and provides voice input of "tell Bill to watch this show", an embodiment may not only identify which show is "this" show (e.g., using program guide information), which user is "Bill" (e.g., using device contacts), but may also interface with a messaging application, e.g., an email application of the user, to send information about the current show to Bill (e.g. current episode, actors, show information, a copy of the show itself, etc.).

Additionally, depending on the context data sources available to an embodiment, increasingly complex questions may be answered based on rather simple natural language user inputs. For example, during the playing of a movie on a user's computer or television, a user may provide voice input of "what other movies is he in". An embodiment may utilize this input to determine that "he" is ambiguous, resolve the ambiguity using context data (e.g., to determine the relevant movie being watched using program guide information and determine the particular actor at the current point in the movie using speaker recognition techniques) and return other casting information, e.g., by accessing an external context data source, e.g., Internet movie data base (IMBD) web page text.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Processors comprise internal arithmetic units, registers, cache memory, busses, I/O ports, etc., as is well known in the art. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces, for example, include SDIO and I2C.

There are power management circuits(s) 130, e.g., a battery management unit, BMU, which manages power as supplied, for example, via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a microphone, which may include physical elements that transform sound waves into an electrical audio signal. Commonly, system 100 will include a touch screen 170 for data input and display/rendering. System 100 also typically includes various memory devices, for example flash memory 180 and SDRAM 190.

Figure 2:
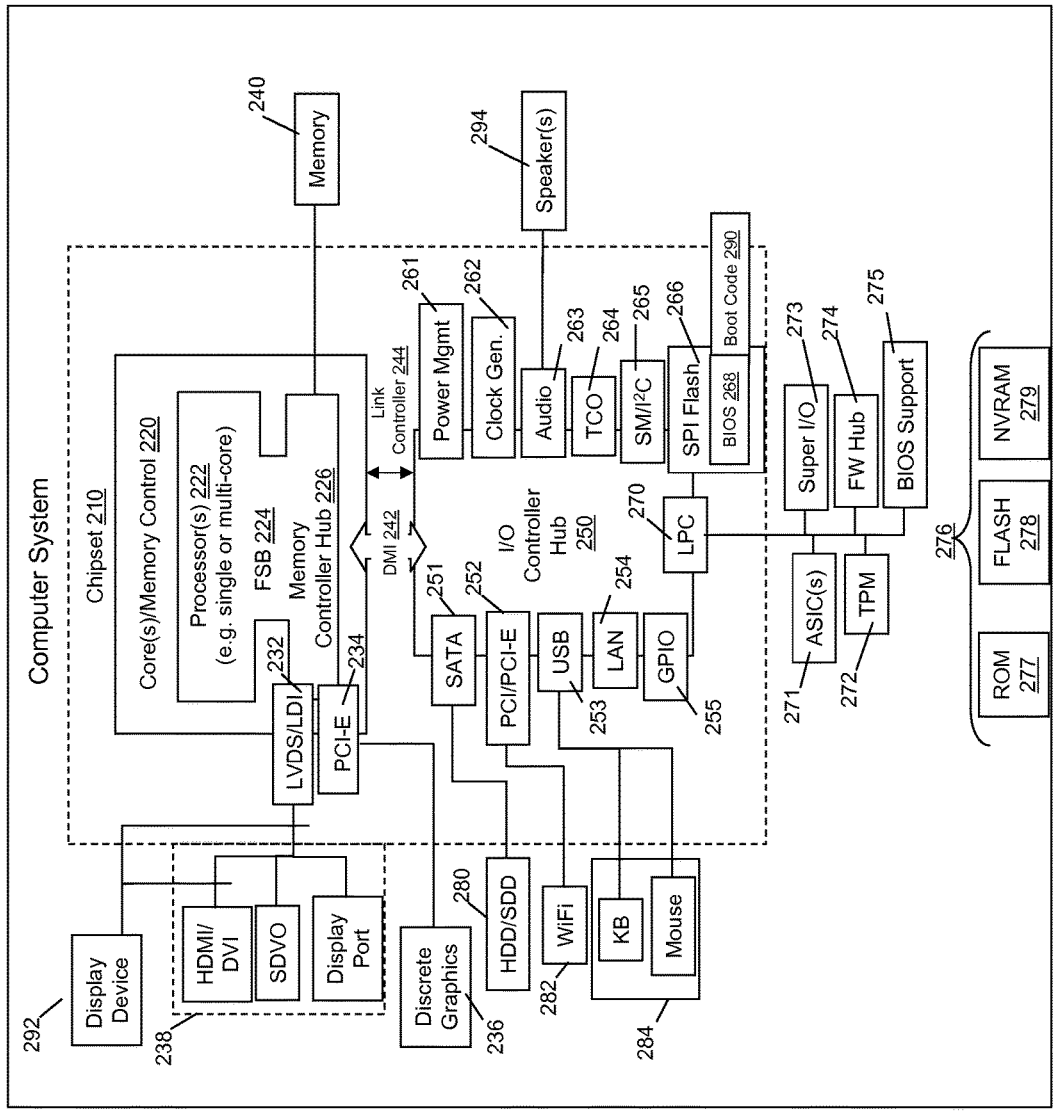
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that allow users to provide voice inputs, e.g., using microphones of the respective devices, that in turn may be utilized by applications running on the devices. In this respect, the device circuitry outlined in FIG. 1 and FIG. 2 may include, e.g., in device memory, speech recognition technology that identifies the word (or words) spoken by the user for use as input to commit actions (e.g., form machine text input, execute a command to control an application, etc.).

Figure 3:
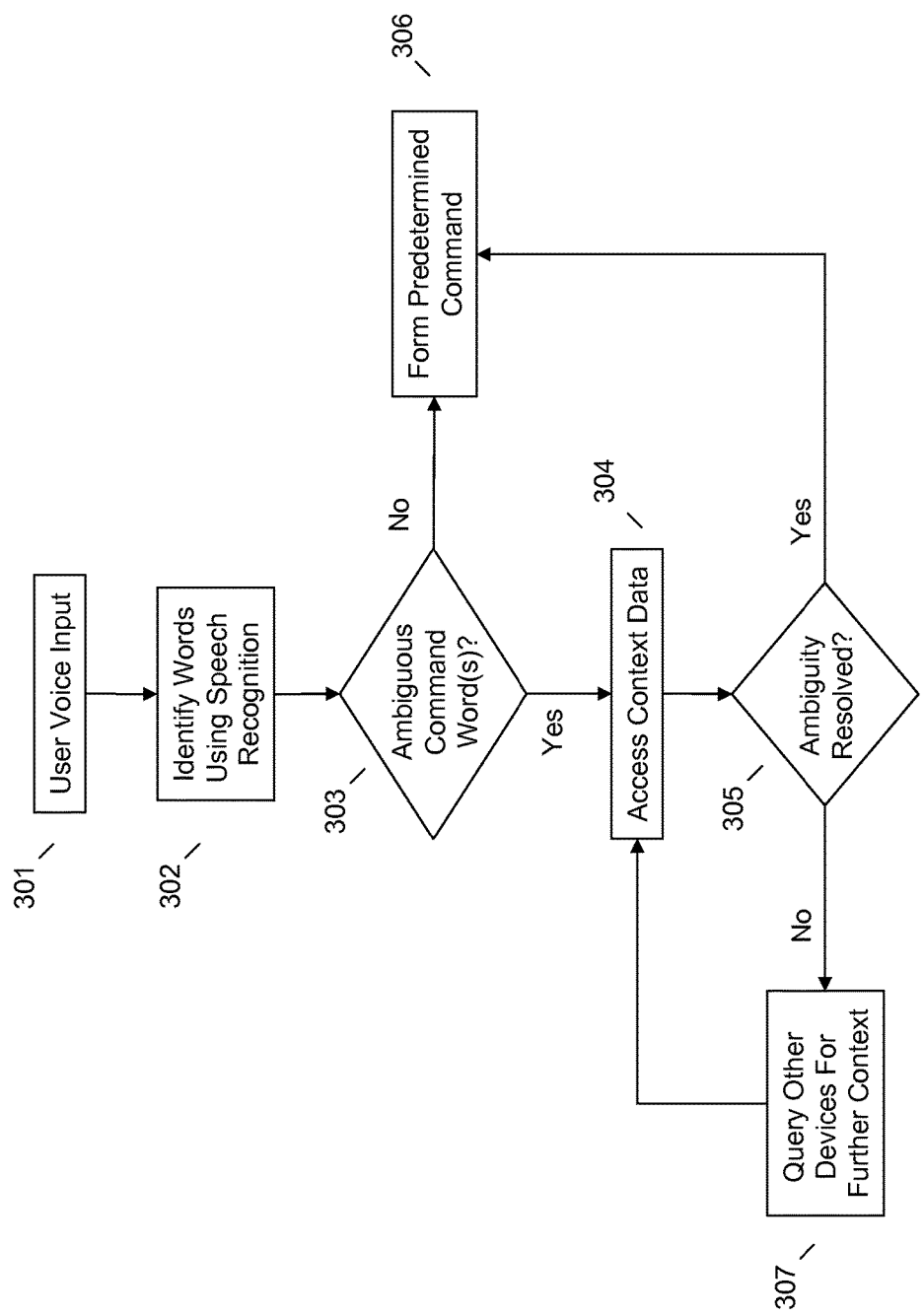
FIG. 3 illustrates an example method of processing natural language user inputs using context data.

FIG. 3 outlines an example method of processing natural language user inputs using context data. As illustrated, an embodiment receives user voice input at 301, e.g., via a microphone included in the device. This voice input may then be processed by a speaker recognition engine at 302 in order to accurately identify the literal input. For example, a user voicing the input "where can I get that" will be recognized by the speech recognition engine at 302 as the literal input of "where", "can", "I", "get" and "that".

While certain technology does exist for parsing and analyzing this string of inputs, i.e., "where", "can", "I", "get" and "that", to identify a command, in this case a "get" type command formed as a search query, the sequence of words of the voice input, although accurately identified, are nonetheless ambiguous from the stand point of determining what to get to. In this example, what "that" refers to is unclear.

Accordingly, an embodiment permits such ambiguities in the user input to be disambiguated utilizing context data, e.g., as found within the user input itself, in other context data, located on the device receiving the input or remotely using other device(s), or a combination of the foregoing. In this example, an embodiment identifies which of the identified words render the user voice input ambiguous. Given that the word "get" may be mapped to a command action, e.g., a search command, it may not be identified as a source of ambiguity.

However, the word "that" may be particularly problematic, as determined at 303. The identification of ambiguous word(s) within the user input may itself leverage context data. For example, the word "get" may be omitted from the identified word(s) causing ambiguity using a straight forward context analysis, e.g., "get" being mapped to a search command and the modality defaulting to the currently running application receiving the input, e.g., internet searching application, etc.

On the other hand, other words may not be so easy to disambiguate. In this example, the word "that" may be predetermined or default-identified as an ambiguous word and so identified at 303. Thus, an embodiment may identify the word "that" as the subject of further analysis using additional context.

Taking the word "that", being identified as a source of ambiguity at 303, an embodiment may leverage a source of context data on the device receiving the user voice input. For example, an embodiment may access context data of the device, e.g., determining that an Internet video is currently being streamed on the device, at 304 in order to attempt disambiguation of the voice input and therefore identification of the appropriate command function to be executed. In this example, an embodiment may determine "that" is a reference to the object included in an ad currently playing in a media player application.

Additionally, other context data may be utilized. The word "that" may therefore be used as a trigger event by which an embodiment accesses additional context data in an effort to interpret/disambiguate the word "that". It should be noted that other such words may be similarly handed and that the word "that" is used as one non-limiting example. For example, an embodiment may similarly disambiguate "these" as well as "this", etc.

Therefore, given the identification at 303 of a source of ambiguity within the user voice input, e.g., "that", an embodiment accesses context data at 304 as is appropriate. In the example of the word "that", an embodiment may determine that on device contextual data is not helpful in resolving the ambiguity, e.g., at 305.

In this regard, the context data accessed at 304 may not include any helpful information for resolving the ambiguity, e.g., there is no ad playing in a media player on the device, etc. At 305 therefore, an embodiment may determine that the ambiguity has not been resolved.

If an embodiment determines that the ambiguity has not been resolved at 305, e.g., to a predetermined confidence threshold, an embodiment may query other context data sources. As described herein, these other context data sources may be located on other devices, e.g., user devices located proximately to the user device receiving the user voice input, remotely located devices, or a combination of the foregoing. Such devices may contain relevant information that may be used as a source of contextual information.

For example, an embodiment may identify a proximately located user device such as a smart TV, a wearable user device, etc. This identification process may use a variety of mechanisms, such as determining one or more other devices are in communication with the device receiving the user input, such as employing short range wireless communication, etc. Moreover, an embodiment may identify remotely located devices that may act as a source of contextual data, e.g., a cloud service may be used by the device that receives the user voice input to identify other relevant contextual data sources.

An embodiment may thus query or request contextual data from other devices at 307. Part of the query or request for another device's contextual data may include a media type identifier, a word derived from the user voice input, and/or a request for additional data capture. By way of example, the contextual data from the user voice input itself may provide a clue as to what "that" may be. For example, for a user voice input of "where can I get that song", the word "song" may itself provide contextual data useful in forming a request or query for further contextual information, e.g., a media type (in this case, MP3, WMA, etc.) may be included in the query to allow the other device receiving the request to identify contextually relevant data, e.g., a currently playing MP3 file resident on the other device. Similarly, a word or words from the voice input may be sent as part of the query or request to another device in an effort to identify relevant contextual information.

Additionally, the query or request for contextual data sent at 307 may include a command or instruction to gather data that is used to form or derive contextual data. For example, the query or request may include a command that one or more sensors of the other device be used to gather additional context (e.g., a camera, a microphone, etc). For example, when watching a non-smart TV or radio, a wearable device's camera or microphone may receive an instruction included in a request sent from a user's smart phone to capture data to be used to learn what is being played on the TV or radio. Thus, an embodiment works through ambiguities by leveraging the surrounding contextual information, whether prepared ahead of time or prepared in real time (or near real time), e.g., including use of on device sensor(s) or other device sensor(s) to gather contextually relevant information.

An embodiment may leverage third party services as part of the processing, e.g., to further process additionally captured data. For example, captured audio or video/image data may be provided, e.g., via a cloud interface, to a third party service for digital identification of the same (e.g., digital fingerprinting). This allows a user to leverage advanced technologies to identify the current content in the user's surrounding context, which in turn may then be merged with the user's request to provide a more complete understanding of the user's intended activity.

By way of example, consider a case where a user inputs "where is this playing" to his or her smart phone or tablet. An embodiment, e.g., implemented as a service running as a virtual assistant on the smart phone or tablet (and/or other devices, in whole or in part), may capture ambient audio using a microphone in an attempt to capture data used to identify the current content context. As described herein, more than one device may be involved, e.g., requesting, that the TV provide current channel information. The context data is then cross referenced with the user input, the additional captured data (e.g., audio data that is identified using a service) to further indicate the context in which the user has issued the input, i.e., what is currently playing or, in this example, what "this" maps to in the query "where is this playing". The proper identification or disambiguation of "this" in the query in turn allows an embodiment to appropriately process the remainder of the query, i.e., to answer where is this playing with respect to venues of upcoming concerts, theaters, a particular television channel and repeated playing of the program containing the audio, etc. It should be noted that an embodiment may request additional input from the user as part of this refining processing.

Once the current content is determined, for example if a movie trailer for a particular movie is playing during the voice input of "where is this playing", a natural language processor (NLP) may determine that the user is asking for something playing. An embodiment correlates that with the fact that a particular movie trailer is playing (using contextual data, as described herein), the user's request, and the user's location (e.g., as sensed through a location service, such as global positioning, triangulation, etc.). With this data, an embodiment may process the user input to understand that the domain is a movie show time. An embodiment may then find the closest movie theaters and display the local movie theaters and the show times for the movie.

As described herein, an embodiment may process user input of any type, e.g., manually typed input, voice input, gesture input, etc., although voice input has been used throughout as a non-limiting and representative example of user input. Similarly, while particular devices have been mentioned specifically in connection with certain processing steps and techniques, the processing may be conducted by a device receiving user input (e.g., a smart phone, a smart TV, a laptop, etc.) or on another device (e.g., a cloud device, a proximately located user device in communication with the receiving device, a remote, network connected device, etc.) or on a combination of devices. Additionally, various services may be utilized, e.g., media identification services, whether proprietary or third party services, etc., as part of the processing of the user input.

Therefore, an embodiment permits users to input natural language commands and have the ambiguities within these natural language commands identified and resolved using relevant context data, such that the commands may be executed, with or without further user input (e.g., user provided input as context data, user confirmation of suggestions, etc.). The commands may be formed on the receiving device and executed by the receiving device, formed on the receiving device and issued to other devices for execution, or some suitable combination of the foregoing. As may be appreciated from the foregoing, an embodiment permits a user to continue using natural language inputs or commands with a minimal amount of failures with respect to the execution of corresponding commands or actions.

As will be understood by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a user device, user input;
   identifying, using a processor, at least one element included in the user input, wherein
   the at least one element renders the user input ambiguous;
   identifying, using a processor, context data associated with the user input from a source of context data comprising another user device producing active media;
   disambiguating, using a processor, the user input based on an association between the at least one element and an aspect of the active media, wherein the aspect is identified at least in part during a duration of the active media that the user input is received; and
   automatically forming, using a processor, an altered input based on the disambiguating.

2. The method of claim 1, further comprising identifying one or more other user devices;
   wherein the source of context data is located on at least one of the one or more other user devices.

3. The method of claim 2, wherein the identifying one or more other user devices comprises utilizing short range wireless communication of the device to identify that the one or more other user devices are proximate to the user device.

4. The method of claim 3, further comprising sending a request for contextual data from the device to the one or more other user devices.

5. The method of claim 4, wherein the request for contextual data includes an indication selected from the group consisting of a media type identifier, a word derived from the user input, and a request for additional data capture.

6. The method of claim 5, wherein the request includes an instruction to capture additional data using one or more sensors of the one or more other user devices.

7. The method of claim 6, wherein the one or more sensors are selected from the group of sensors consisting of a camera and a microphone.

8. The method of claim 7, wherein the additional data is utilized to prepare contextual data.

9. The method of claim 1, further comprising committing a predetermined action based on the altered input.

10. The method of claim 9, wherein the predetermined action comprises transmitting the altered input to at least one other device for execution.

11. A device, comprising:
an input device;
a processor; and
a memory device that stores instructions executable by the processor to:
receive, via the input device, user input;
identify at least one element included in the user input, wherein
the at least one element renders the user input ambiguous;
identify context data associated with the user input from a source of context data comprising another user device producing active media;
disambiguate the user input based on an association between the at least one element and an aspect of the active media, wherein the aspect is identified at least in part during a duration of the active media that the user input is received; and
automatically form an altered input based on the disambiguated user input.

12. The device of claim 11, wherein the instructions are executable by the processor to identify one or more other user devices;
wherein the source of context data is located on at least one of the one or more other user devices.

13. The device of claim 12, wherein to identify one or more other user devices comprises utilizing short range wireless communication of the device to determine that the one or more other user devices are proximate to the device.

14. The device of claim 13, wherein the instructions are executable by the processor to send a request for contextual data from the device to the one or more other user devices.

15. The device of claim 14, wherein the request for contextual data includes an indication selected from the group consisting of a media type identifier, a word derived from the user input, and a request for additional data capture.

16. The device of claim 15, wherein the request includes an instruction to capture additional data using one or more sensors of the one or more other user devices.

17. The device of claim 16, wherein the one or more sensors are selected from the group of sensors consisting of a camera and a microphone.

18. The device of claim 17, wherein the additional data is utilized to prepare contextual data.

19. The device of claim 11, wherein the instructions are executable by the processor to commit a predetermined action based on the disambiguated input.

20. A product, comprising:
a storage medium having code stored therewith, the code being executable by a processor and comprising:
code that receives, via an input device, user input;
code that identifies, using a processor, at least one element included in the user input, wherein
the at least one element renders the user input ambiguous;
code that identifies, using a processor, context data associated with the user input from a source of context data comprising another user device producing active media;
code that disambiguates, using a processor, the user input based on an association between the at least one element and an aspect of the active media, wherein the aspect is identified at least in part during a duration of the active media that the user input is received; and
code that automatically forms, using a processor, an altered input based on the disambiguated user input.

21. A method, comprising:
receiving, from a device, data relating to a user input;
the data being used to identify, using a processor, at least one ambiguity contained in the user input, wherein the at least one ambiguity is based upon at least one element included within the user input;
identifying, using a processor, context data associated with the user input from a source of context data comprising another user device producing active media;
disambiguating, using a processor, the user input based on an association between the at least one element and an aspect of the active media, wherein the aspect is identified at least in part during a duration of the active media that the user input is received; and
automatically forming, using a processor, an altered input based on the disambiguated user input.

* * * * *